United States Patent
Brewer, Jr. et al.

(10) Patent No.: US 7,864,783 B2
(45) Date of Patent: Jan. 4, 2011

(54) SYSTEM AND METHOD FOR CONVEYING PRIORITY ASSOCIATED WITH A COMMUNICATION AMONG A PLURALITY OF NETWORKS

(75) Inventors: Orlie Thomas Brewer, Jr., Issaquah, WA (US); Alimuddin Mohammad, Redmond, WA (US); Arun Ayyagari, Seattle, WA (US)

(73) Assignee: The Boeing Company, Chicago, IL (US)

( * ) Notice: Subject to any disclaimer, the term of this patent is extended or adjusted under 35 U.S.C. 154(b) by 141 days.

(21) Appl. No.: 12/249,772

(22) Filed: Oct. 10, 2008

(65) Prior Publication Data

US 2010/0091650 A1   Apr. 15, 2010

(51) Int. Cl.
*H04L 12/28* (2006.01)
(52) U.S. Cl. .................................. 370/395.65
(58) Field of Classification Search ........................ None
See application file for complete search history.

(56) References Cited

U.S. PATENT DOCUMENTS

| | | | |
|---|---|---|---|
| 5,687,167 A | | 11/1997 | Bertin et al. |
| 7,164,890 B2 * | | 1/2007 | Eriksson et al. ............... 455/69 |
| 2005/0041669 A1 * | | 2/2005 | Cansever et al. ......... 370/395.21 |
| 2006/0056291 A1 | | 3/2006 | Baker et al. |
| 2007/0206640 A1 * | | 9/2007 | Egan et al. ................... 370/479 |
| 2007/0206643 A1 * | | 9/2007 | Egan et al. ................... 370/479 |
| 2008/0005564 A1 * | | 1/2008 | Agarwal ...................... 713/171 |
| 2008/0205374 A1 * | | 8/2008 | Qian et al. ................... 370/347 |
| 2009/0069057 A1 * | | 3/2009 | Haartsen et al. ............. 455/574 |

OTHER PUBLICATIONS

Baker, F., Iturraide, C., LeFaucheur, F. and Davie, B.; "RSVP Reservation Aggregation"; Request for Comment (RFC) The Internet Society, Network Working Group; Sep. 2001.

Herzog S.; "Signaled Preemption Priority Policy Element"; Request for Comment (RFC); The Internet Society; Network Working Group; Oct. 2001.

(Continued)

*Primary Examiner*—Chi H Pham
*Assistant Examiner*—Fan Ng
(74) *Attorney, Agent, or Firm*—Law Office of Donald D. Mondul

(57) ABSTRACT

A system for conveying priority associated with a communication conveyed among networks includes: (a) a first network originating the communication in packets; each respective packet including two segments; a first segment containing a portion of the communication in information payload bits in a first encoding scheme; a second segment containing overhead information relating to the packet in overhead bits in a second encoding scheme; a number of the overhead bits being configured to indicate the priority; and (b) a second network cooperating with the first network to alter encoding of the first segment of a selected packet-set to express the information payload bits in a third encoding scheme that is unreadable in the second network; the second network employing the priority-indicating bits to ascertain priority for handling the communication by the second network; the second network preempting lower priority resources to reserve resources for higher priority packet-sets.

10 Claims, 3 Drawing Sheets

OTHER PUBLICATIONS

Polk. J. and Dhesikan, S.; "RSVP Bandwidth Reduction"; Request for Comment (RFC); The Internet Society, Network Working Group; May 2006.

Brewer, Orlie; Mohammad, Alimuddin & Ayyagari, Arun; "QoS Provisioning vi Disseminated Information on Differentiated Services Class Utilization"; Presented Jun. 17, 2008 for prepublication review for presentation at MILCOM Conference, Nov. 17-19, 2008.

Global Information Grid Net-Centric Implementation Document: Transport (T000); Dec. 2005; Department of Defense; Unclassified—For Official Use Only.

Global Information Grid Net-Centric Implementation Document Quality of Service (T300); Dec. 2005; Department of Defense; Unclassified—For Official Use Only.

* cited by examiner

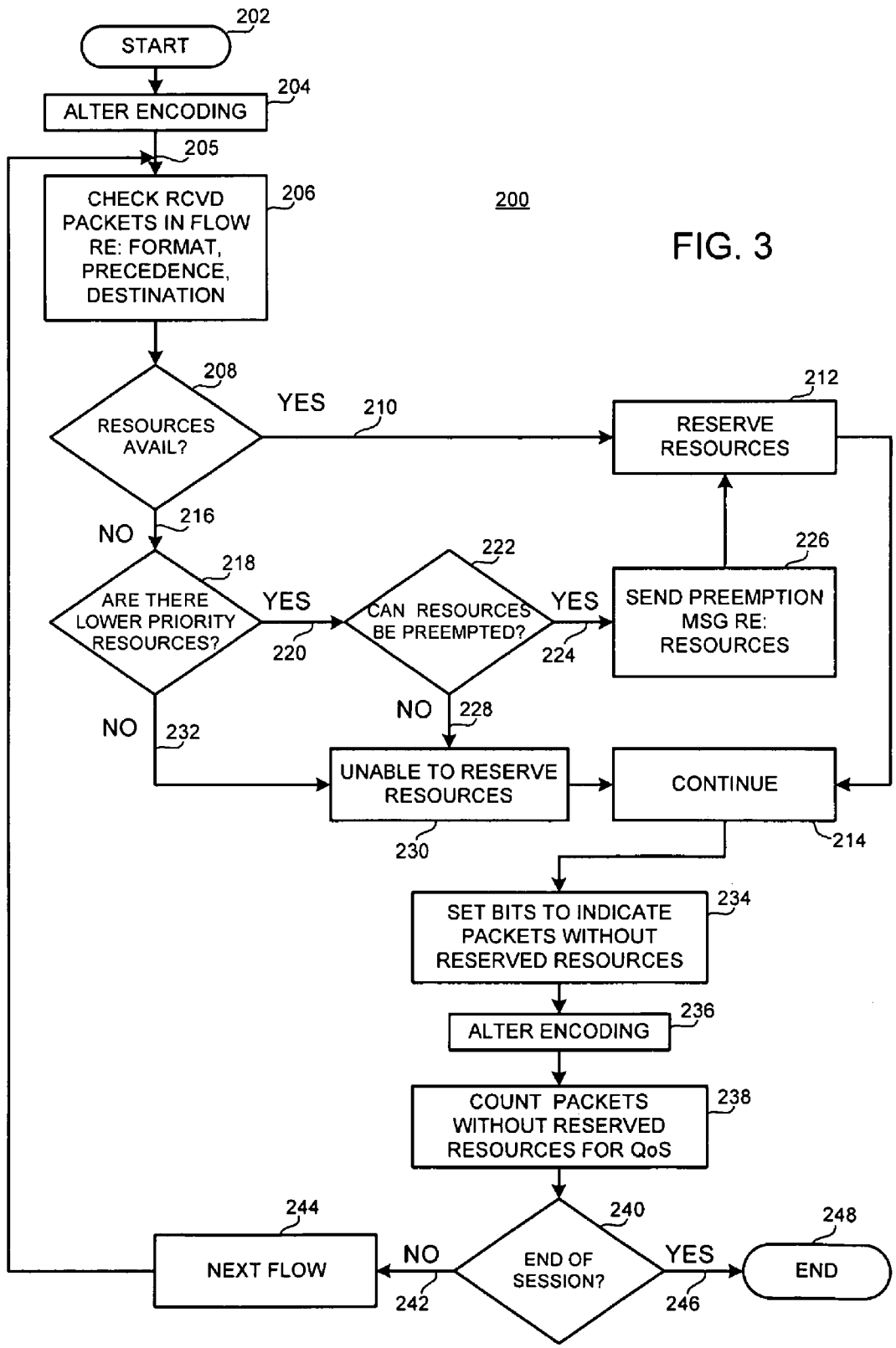

SYSTEM AND METHOD FOR CONVEYING PRIORITY ASSOCIATED WITH A COMMUNICATION AMONG A PLURALITY OF NETWORKS

FIELD

The present disclosure may be directed to communication networks, and especially to accommodating priority or precedence for messages conveyed via communication networks using differently encoded communications.

BACKGROUND

Networks may communicate messages among them using differently encoded communications. By way of example and not by way of limitation, the present disclosure may describe the disclosed system and method in terms of networks that may communicate using encrypted and non-encrypted communications such as shared cipher-text transport networks for Integrated Services (IntServ) Resource ReSerVation Protocol (RSVP) flows. The present disclosure may present a system and method to distinguish priority or preemption levels within differently encoded networks such as, by way of example and not by way of limitation, IntServ/RSVP flows originating in plain-text edge networks that may be isolated from the transport networks by High Assurance Internet Protocol Encryptor (HAIPE) devices where RSVP signaling may be restricted.

The system and method may dynamically reduce the reserved resources of lower priority flows within the cipher-text shared transit network, if necessary, in order to reserve resources for higher priority flows without seeing the RSVP signaling from the plain-text network, and may notify the plain-text security enclaves regarding the reduction in reserved resources for lower priority flows.

Some real-time traffic flows may employ Quality of Service (QoS) applications to establish priority or preemption levels communications. Employing end-to-end Quality of Service (QoS) provisioning may permit applications to request end-to-end, per-conversation, QoS from a network to enable end-to-end priority or preemption or precedence treatment of communications among a plurality of networks.

The existing solutions for a priority or preemption capability for internetwork flows assume that any node that needs to preempt or reduce bandwidth for a lower priority flow can communicate directly to the source and destination of all communication sessions and that any aggregator or deaggregator of an aggregated session has knowledge of the signaling from the aggregated flows. In some frameworks, the aggregated sessions may be dynamically established, by way of example and not by way of limitation, and adjusted in the cipher-text domain based solely on the amount of traffic with specific DSCP values. The existing solutions are not viable within a partitioned plurality of networks having portions isolated from other portions such as, by way of example and not by way of limitation, a HAIPE partitioned network.

There is a need for a system and method for conveying priority associated with a communication among a plurality of networks having portions isolated from other portions. There is also a need for a system and method for providing end-to-end priority or preemption or precedence treatment of communications among a plurality of networks having portions isolated from other portions.

SUMMARY

A system for conveying priority associated with a communication conveyed among a plurality of networks includes: (a) a first network originating the communication in a plurality of packets; each respective packet including two segments; a first segment containing a portion of the communication in information payload bits in a first encoding scheme; a second segment containing overhead information relating to the respective packet in overhead bits in a second encoding scheme; a number of the overhead bits being configured to indicate the priority; and (b) a second network coupled with the first network; the first and second networks cooperating to alter encoding of the first segment of a selected packet-set to express the information payload bits in a third encoding scheme that is unreadable in the second network; the second network employing the priority-indicating bits to establish priority for handling the communication by the second network; the second network preempting resources allocated to lower priority packet-sets as necessary to effect reserving resources for higher priority packet-sets.

A system for conveying priority associated with a message conveyed among a plurality of networks in a plurality of communication packets; each respective packet of the plurality of packets including at least two segments; a first segment of the at least two segments containing at least a portion of the message in a plurality of information payload bits; a second segment of the at least two segments containing overhead information relating to the respective packet in a plurality of overhead bits; includes: a first network of the plurality of networks having the first segment composed in a first unencrypted encoding scheme; the second segment in the first network being composed in a second unencrypted encoding scheme; a predetermined number of the plurality of overhead bits being configured as priority-indicating bits to indicate the priority; and (b) a second network of the plurality of networks coupled with the first network; the first network and the second network cooperating to alter encoding of each respective first segment to express the plurality of information payload bits in a third encrypted encoding scheme that is unreadable in the second network; the second network employing the priority-indicating bits to ascertain the priority for handling the message within the second network; the second network preempting resources allocated to lower priority packet-sets as necessary to effect reserving resources for higher priority packet-sets.

A method for conveying priority associated with a message conveyed among a plurality of networks in a plurality of communication packets; each respective packet of the plurality of packets including at least two segments; a first segment of the at least two segments containing at least a portion of the message in a plurality of information payload bits; a second segment of the at least two segments containing overhead information relating to the respective packet in a plurality of overhead bits; includes: (a) in no particular order: (1) composing the first segment in a first unencrypted encoding scheme in a first network of the plurality of networks; and (2) composing the second segment in a second unencrypted encoding scheme in the first network; (b) configuring a predetermined number of the plurality of overhead bits as priority-indicating bits to indicate the priority; (c) operating a second network of the plurality of networks coupled with the first network cooperatively to alter encoding of each respective the first segment to express the plurality of information payload bits in a third encrypted encoding scheme; that is unreadable in the second network and (d) operating the second network to employ the priority-indicating bits for ascertaining priority for handling the message by the second network; the second network preempting resources allocated to lower priority packet-sets as necessary to effect reserving resources for higher priority packet-sets.

It is, therefore, a feature of the present disclosure to provide a system and method for conveying priority associated with a communication among a plurality of networks having portions isolated from other portions.

One or more embodiments may provide end-to-end priority or preemption or precedence treatment of communications among a plurality of networks having portions isolated from other portions.

Further advantages of the disclosed embodiments will be apparent from the following specification and claims when considered in connection with the accompanying drawings, in which like elements are labeled using like reference numerals in the various figures, illustrating the preferred embodiments of the disclosure.

BRIEF DESCRIPTION OF THE DRAWINGS

FIG. 3 is a detailed flow diagram illustrating the method of the present disclosure.

DETAILED DESCRIPTION

Figure 1:
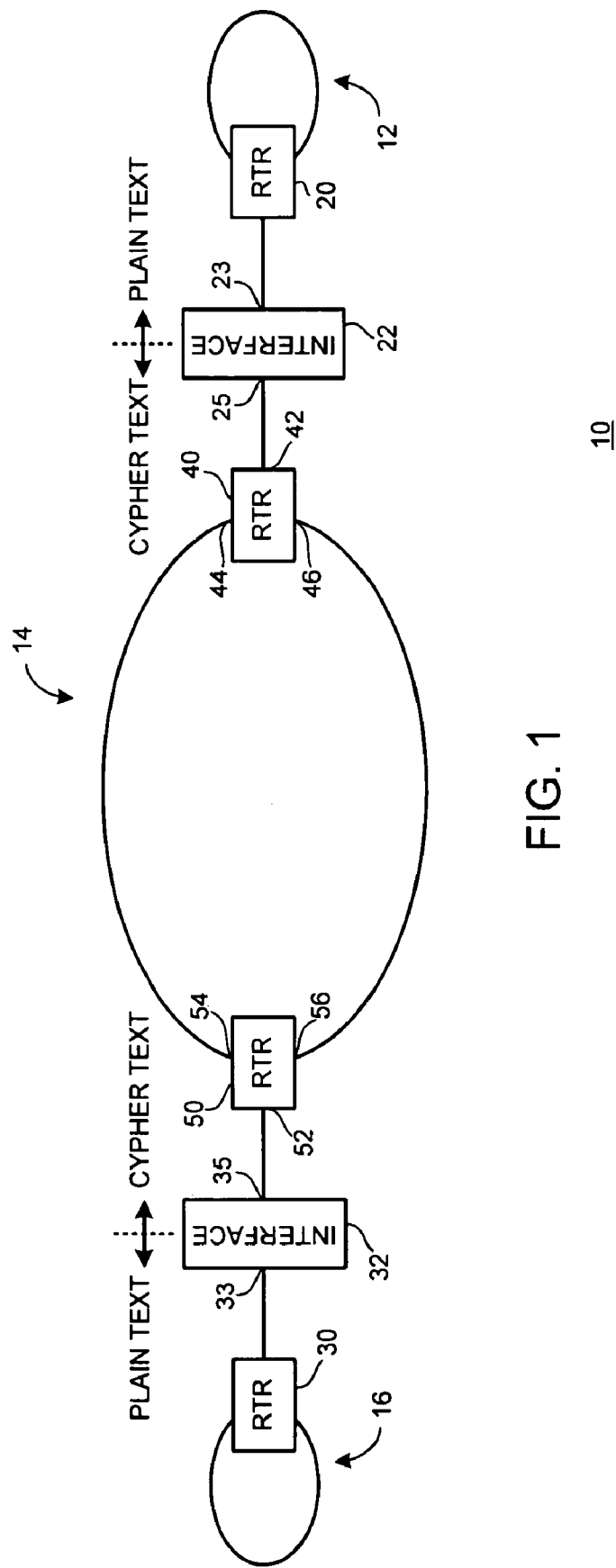
FIG. 1 is a schematic diagram of a plurality of communication networks arranged to effect the system of the present disclosure.

FIG. 1 is a schematic diagram of a plurality of communication networks arranged to effect the system of the present disclosure. In FIG. 1, a system 10 may include a first communication network 12, a second communication network 14 and a third communication network 16.

First communication network 12 may include a router 20 (indicated as "RTR" in FIG. 1) coupled for serving installations in first communication network 12 (not shown in detail in FIG. 1). Router 20 may be coupled with second communication network 14 via an interface unit 22. Interface unit 22 may be configured for performing a plurality of functions including, by way of example and not by way of limitation, altering encoding of information received in a communication composed in a first encoding scheme at a first locus 23 to express the received communication in a second encoding scheme for presentation at a second locus 25. Interface unit 22 may also operate to alter encoding of information received in a communication composed in the second encoding scheme at second locus 25 to express the received communication in the first encoding scheme for presentation at first locus 23. Such a coding-decoding capability may permit interface unit 22 to establish, by way of example and not by way of limitation, that ciphered (i.e., encrypted) text may be presented at second locus 25 for handling by second communication network 14, and plain text may be presented at first locus 23 for handling by first communication network 12.

Third communication network 16 may include a router 30 (indicated as "RTR" in FIG. 1) coupled for serving installations in third communication network 16 (not shown in detail in FIG. 1). Router 30 may be coupled with second communication network 14 via an interface unit 32. Interface unit 32 may be configured for performing a plurality of functions including, by way of example and not by way of limitation, altering encoding of information received in a communication composed in a third encoding scheme at a third locus 33 to express the received communication in the second encoding scheme for presentation at a fourth locus 35. Interface unit 32 may also operate to alter encoding of information received in a communication composed in the second encoding scheme at fourth locus 35 to express the received communication in the third encoding scheme for presentation at third locus 33. Such a coding-decoding capability may permit interface unit 32 to establish, by way of example and not by way of limitation, that ciphered (i.e., encrypted) text may be presented at fourth locus 35 for handling by second communication network 14, and plain text may be presented at third locus 33 for handling by third communication network 16. When the first and third encoding schemes are the same encoding scheme, first communication network 12 may communicate with third communication network 16 in plain text without involving second communication network 14.

Second communication network 14 may include routers 40, 50 (indicated as "RTR" in FIG. 1) coupled for serving installations in second communication network 14 (not shown in detail in FIG. 1). Router 40 may be coupled with first communication network 12 via interface unit 22. Router 50 may be coupled with second communication network 14 via interface unit 32.

Router 40 may administer Quality of Service (QoS) functions regarding communications received from interface unit 22 for second communication network 14. Alternatively, router 40 and interface unit 22 may cooperate in administering QoS functions regarding communications provided for second communication network 14 from interface unit 22.

Router 50 may administer Quality of Service (QoS) functions regarding communications received from interface unit 32 for second communication network 14. Alternatively, router 50 and interface unit 32 may cooperate in administering QoS functions regarding communications provided for second communication network 14 from interface unit 32.

By way of example and not by way of limitation, the disclosure may be described in an exemplary system 10 that involves communication networks 12, 14, 16 that may communicate using encrypted and non-encrypted communications such as shared cipher-text transport networks for Integrated Services (IntServ) Resource ReSerVation Protocol (RSVP) flows. As used herein, the term exemplary indicates an example and not necessarily an ideal. Communications may be configured in a plurality of packets. Each respective packet may include two segments. A first segment may contain a portion of the communication in information payload bits in a first encoding scheme. A second segment may contain overhead information relating to the respective packet in overhead bits in a second encoding scheme. A number of the overhead bits may be configured to indicate the priority of the message or communication to be conveyed. The present disclosure may present a system and method to distinguish priority or preemption levels within differently encoded networks such as, by way of example and not by way of limitation, IntServ/RSVP flows originating in plain-text edge networks (e.g., first communication network 12 or third communication network 16) that may be isolated from the transport networks by High Assurance Internet Protocol Encryptor (HAIPE) devices (e.g., interface units 22, 32) where RSVP signaling may be restricted.

Interface units 22, 32 may be configured to employ High Assurance Internet Protocol Encryptor (HAIPE) to provide cryptographic isolation between data in plain-text security enclaves (e.g., communication networks 12, 16) and data that may be transported across a cipher-text shared transit network (e.g., second communication network 14) by using an IP Security (IPSec) tunnel mode with Encapsulating Security Payload (ESP). Quality of Service (QoS) may be implemented within the cipher-text shared transit network (e.g., second communication network 14) by employing Differentiated Services (DiffServ) which may be based on a six-bit DiffServ Code Point(DSCP) in the IP (Internet Protocol) header of the data being transferred. The DSCP may include a two-bit Explicit Congestion Notification (ECN) field in a Type of Service(ToS) byte and may be transported across the plain-text/cipher-text boundaries established at interface units 22, 32. If desired, the DSCP, including the ECN field, may pass among various networks, unencrypted and encrypted, substantially unchanged so as to preserve information contained in those fields as the associated communication traverses various communication networks.

Real-time traffic flows may establish an end-to-end QoS provisioning via Integrated Services (IntServ), which may use a protocol called Resource ReSerVation Protocol (RSVP). Using RSVP one may request end-to-end, per-conversation, QoS from a network. However, because RVSP signaling traffic may not be transported across network boundaries, RVSP signaling traffic may be encrypted within HAIPE tunnels and QoS provisioning within the cipher-text network may not occur. This shortcoming may occur when the different RSVP flows cannot be distinguished because they are encapsulated within HAIPE tunnels.

Messaging may be arranged in a succession of sessions, each respective session may include at least one flow. Messages or communications are transmitted in packets as will be understood by one skilled in the art of communication system design. The DSCP value may be set in the packets of all RSVP flows to a respective designated priority level for the message or communication of which the packet may be a part. The ECN bits may be set to ECT(0). These values may be copied in an IP header associated with each respective packet by an IP Security (IPSEC) encryptor as the packets enter the IPSEC tunnel and may be visible in the cipher-text network (e.g., second communication network 14).

A protocol or program may be created to watch for arrival of a packet with a designated DSCP value. Upon detecting a watched-for DSCP value, the program may note the DSCP value, source IP address, and destination IP address for the extant packet.

Upon detecting a designated DSCP-valued packet, an aggregated RSVP session for that DSCP may be requested with reservation for one increment of bandwidth. The increment of bandwidth may be configurable. Traffic for an established aggregated RSVP session may be monitored. If the traffic for a particular DSCP exceeds the current reservation, an increase of one increment may be requested. If there is no traffic for a predetermined interval of time, the aggregated RSVP session for that DSCP may be removed. The timer interval may be configurable.

Upon notification from an intermediate router that resources for an aggregated RSVP session are being rejected or preempted, a reduced RSVP session may be requested and the ECN bits may be set to a predetermined value (e.g., "CE", to indicate "Congestion Encountered") in all over-limit packets for that RSVP session. Upon a request for an RSVP session or for an increase of resources, if sufficient resources may be available, the request may be accepted. If sufficient resources are not available, but if there are lower priority sessions that may provide sufficient resources, the request may be accepted and a router accepting the lower priority sessions for ingress to the encrypted communication network (e.g., second communication network 14) may be notified to reduce the resource for those lower-priority aggregated RSVP sessions. If there are not lower priority sessions that may provide sufficient resources, the request for an RSVP session or for an increase of resources may not be accepted.

A protocol or program may be created to watch for packets with ECN bits set to CE. Flows with packets having ECN bits set to CE may be monitored to estimate the percentage of over-limit packets. Over-limit packet count information may be provide to a QoS Service Provider on the ingress router of the source plain-text network (e.g., router 20) and then to the application on the host within the plain-text network (e.g., communication network 12).

Packet communications intended for traversing across or within an encrypted network (e.g., communication network 14) such as, by way of example and not by way of limitation, Intserv/RSVP flows may be grouped according to priority and flows of the same priority from one edge network to another (e.g., communication networks 12, 16) may be aggregated together in one RSVP session within the cipher-text network (e.g., communication network 14). Traffic handling capabilities regarding various priority levels may be dynamically adjusted based on the amount of traffic of a respective priority. Thus, the QoS Service Provider framework within the cipher-text networks (i.e., system 10) may distinguish the different priorities of the aggregated RSVP sessions and may reduce the resources reserved for a lower priority session in order to accommodate a higher priority session. Using the ECN bits in the IP packet header, the destination plain-text network (e.g., communication network 16) may be notified of the reduction in reserved resources and can calculate the percentage that have been reduced. The applications initiating the IntServ/RSVP flows (located in the initiating plain-text network; e.g., communication network 12) may be eventually notified of the reduction and may take actions appropriate to the application. Thus, the system and method of the present disclosure may provide a priority-preemption capability within a system including cipher networks and plain-text networks (cipher-text networks) for flows originating in the plain text edge networks (e.g., communication networks 12, 16) so that higher priority flows may be given preference for reserved resources, and lower priority flows may be notified of their preemption.

The system and method of the present disclosure may create an aggregated communication or flow session between the ingress router (e.g., router 40) and egress router (e.g., outer 50) in the cipher-text shared transit network between two plain-text security enclaves (e.g., communication networks 12, 16) for each communication priority level that has traffic flowing between the two plain-text networks 12, 16. The priority level may be defined by dropping precedence level of the DSCP. The amount of resources requested for each priority level may be determined and dynamically adjusted based on the amount of traffic for the respective priority level. The priority levels of the aggregated communication sessions within the cipher-text network (e.g., system 10) may be distinguished and the resources of a lower priority RSVP session may be dynamically reduced in order to increase the resources of a higher priority session.

To inform the destination plain-text network (e.g., communication network 16) of the reduction of reserved resources for the lower priority RSVP session, the ECN bits in the IP packet headers of all overlimit packets of the flows in the aggregated communication session whose reserved resources were reduced, may be set to Congestion Encountered (CE), in order to notify the first router in the destination plain-text network (e.g., router 30) of the reduction within the cipher-text network (system 10). The percentage of packets with ECN bits set to CE arriving at the destination plain-text network (e.g., communication network 16) may indicate the amount that each flow may be exceeding the allocated resources for a respective priority level in the transit network (e.g., communication network 14). The information indicating the amount that each flow may be exceeding the allocated resources for a respective priority level in the transit network may be sent back to the source plain-text network (e.g., communication network 12).

Using information indicating the amount that each flow may be exceeding the allocated resources for a respective priority level in the transit network, a QoS Service Provider framework in the source plain-text network (e.g., communication network 12) may know that a certain percentage of resources within the cipher-text network (e.g., system 10) may not have been able to be reserved and may notify the applications employing those lower priority flows of that situation.

Figure 2:
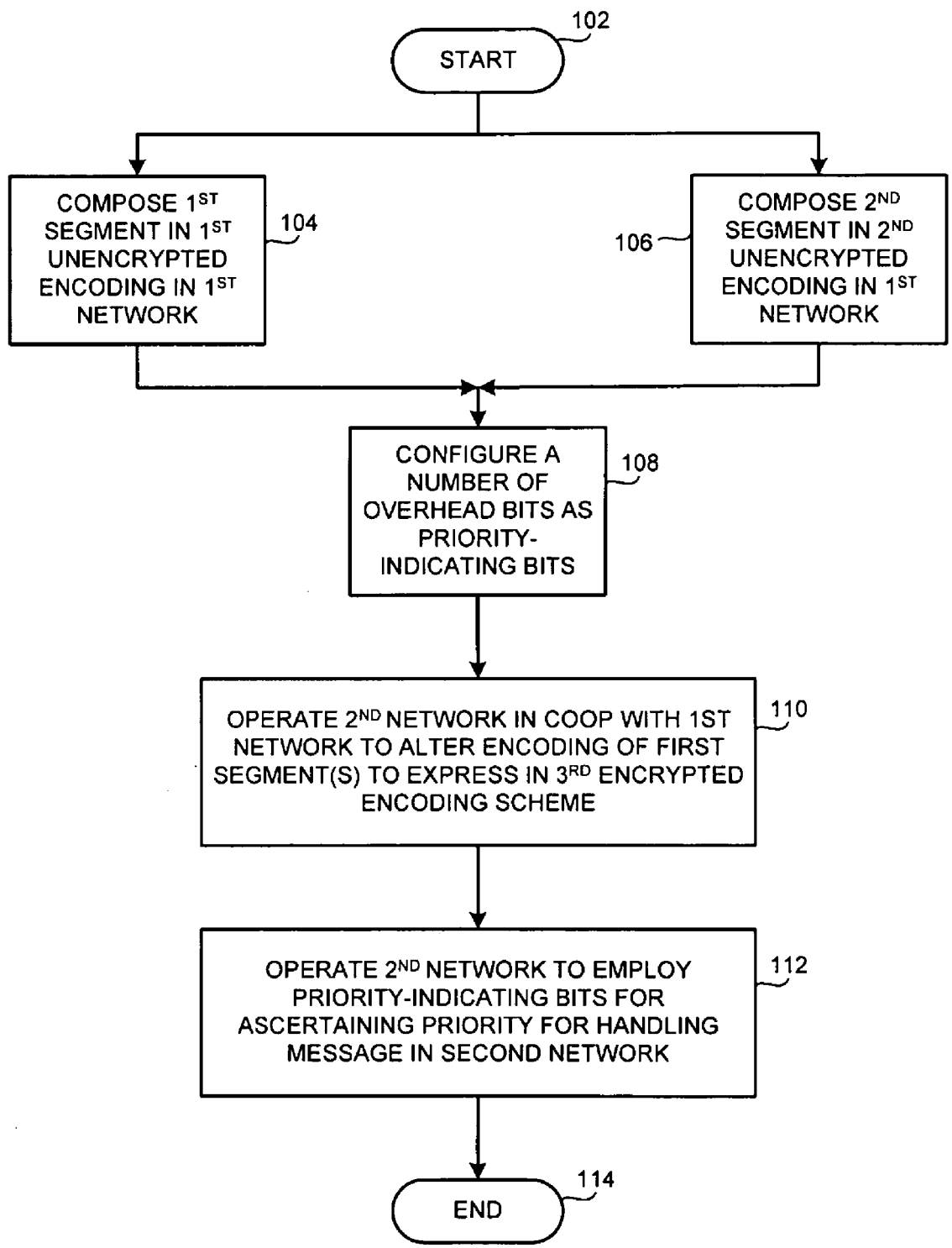
FIG. 2 is a simplified flow diagram illustrating the method of the present disclosure.

FIG. 2 is a simplified flow diagram illustrating the method of the present disclosure. In FIG. 2, a method 100 for conveying priority associated with a message conveyed among a plurality of networks in a plurality of communication packets may begin at a START locus 102. Each respective packet of the plurality of packets may include at least two segments. A first segment of the at least two segments may contain at least a portion of the message in a plurality of information payload bits. A second segment of the at least two segments may contain overhead information relating to the respective packet in a plurality of overhead bits. Method 100 may continue with, in no particular order: (1) composing the first segment in a first unencrypted encoding scheme in a first network of the plurality of networks, as indicated by a block 104; and (2) composing the second segment in a second unencrypted encoding scheme in the first network, as indicated by a block 106.

Method 100 may continue with configuring a predetermined number of the plurality of overhead bits as priority-indicating bits to indicate the priority, as indicated by a block 108. Method 100 may continue with operating a second network of the plurality of networks coupled with the first network cooperatively to alter encoding of each respective the first segment to express the plurality of information payload bits in a third encrypted encoding scheme, as indicated by a block 110. Method 100 may continue with operating the second network to employ the priority-indicating bits for ascertaining the priority for handling the message by the second network, as indicated by a block 112. Finally, method 100 may terminate at an END locus 114.

FIG. 3 is a detailed flow diagram illustrating the method of the present disclosure. In FIG. 3, a method for conveying priority associated with a message conveyed among a plurality of networks in a plurality of communication packets may begin at a START locus 202. The message may be embodied in communications originating from an originating unencrypted or plain-text edge network such as, by way of example and not by way of limitation, communication network 12 (FIG. 1). Communications may traverse a delivering network such as, by way of example and not by way of limitation, communication network 14 (FIG. 1). Communications may be presented to a receiving network such as, by way of example and not by way of limitation, communication network 16 (FIG. 1). Communications may be organized or formatted in a plurality of successive packets arranged in a plurality of successive flows for traversing the delivering network for presentation to the receiving network. A plurality of flows may make up a session.

Method 200 may continue with altering encoding of the message from a first encoding scheme in the originating network to a second encoding scheme for use in the delivering network, as indicated by a block 204. By way of example and not by way of limitation, the first encoding scheme may be a plain-text unencrypted encoding scheme, and the second encoding scheme may be an encrypted encoding scheme. Method 200 may continue with checking received packets in the extant flow regarding format, precedence and destination of the associated message, as indicated by a block 206. Method 200 may continue by posing a query whether resources may be available in the delivering network for handling the extant flow with its precedence category, as indicated by a query block 208. If resources may be available in the delivering network for handling the extant flow with its precedence category, method 200 may proceed from query block 208 via a YES response line 210 and resources may be reserved appropriate for handling the extant flow, as indicated by a block 212. Method 200 may proceed from block 212 to a CONTINUE block 214.

If resources are not available in the delivering network for handling the extant flow with its precedence category, method 200 may proceed from query block 208 via a NO response line 216 and a query may be posed whether lower-precedence or lower-priority resources are available in the delivering network for effecting message handling, as indicated by a query block 218.

If lower-precedence or lower-priority resources are available in the delivering network for effecting message handling, method 200 may proceed from query block 218 via a YES response line 220 and a query may be posed whether any lower priority resources in the delivering network may be preempted, as indicated by a query block 222. If any lower priority resources in the delivering network may be preempted, method 200 may proceed from query block 222 via a YES response line 224, and an appropriate preemption message or appropriate preemption messages may be sent to the originating network, as indicated by a block 226. Method 200 may thereafter proceed to block 212, the newly preempted resources may be reserved and method 200 may proceed to CONTINUE block 214.

If no lower-precedence or lower-priority resources in the delivering network may be available for effecting message handling, method 200 may proceed from query block 218 via a NO response line 232 and at least one of the delivering network and the originating network may be advised of the inability to reserve sufficient resources to handle the volume of extant traffic having a particular precedence or priority, as indicated by a block 230. Method 200 may proceed from block 230 to CONTINUE block 214.

Method 200 may proceed from CONTINUE block 214 to set appropriate bits, such as, by way of example and not by way of limitation, in an IP (Internet Protocol) header associated with the message to indicate information relating to the occurrence of packets without having reserved resources, as indicated by a block 234. By way of example and not by way of limitation, the information relating to the occurrence of packets without having reserved resources may indicate that a respective packet may have no reserved resources.

Method 200 may continue with altering encoding of the message from the second encoding scheme in the delivering network to a third encoding scheme for use in the receiving network, as indicated by a block 236. By way of example and not by way of limitation, the third encoding scheme may be a plain-text unencrypted encoding scheme. The third encoding scheme may be the same as the first encoding scheme.

Method 200 may continue with counting the number of packets not having reserved resources (indicated pursuant to block 234) for use with Quality of Service (QoS) administration in one or more of the originating network, the delivering network and the receiving network.

Method 200 may continue by posing a query whether the extant session is ended, as indicated by a query block 240. If the extant session is not ended, method 200 may proceed from query block 240 via a NO response line 242 and a next flow may be treated, as indicated by a block 244. Method 200 may proceed from block 244 to a locus 205 and then proceed from locus 205 substantially as described above until method steps again arrive at query block 240. Finally, if the extant session is ended, method 200 may proceed from query block 240 via a YES response line 246 and method 200 may terminate at an END locus 248.

By way of example and not by way of limitation, steps represented by blocks 202, 204 may be performed in first communication network 12, including router 20 (FIG. 1). By way of further example, and not by way of limitation, steps represented by blocks 236, 238 may be performed in third communication network 16 (FIG. 1). By way of still further example and not by way of limitation, other steps described in connection with FIG. 2 may be performed in second communication network 14 (FIG. 1).

It is to be understood that, while the detailed drawings and specific examples given describe preferred embodiments of the disclosure, they are for the purpose of illustration only, that the apparatus and method of the disclosure are not limited to the precise details and conditions disclosed and that various changes may be made therein without departing from the spirit of the disclosure which is defined by the following claims:

We claim:

1. A system for conveying priority associated with a communication conveyed among a plurality of networks; the system comprising:
   (a) at least one first network originating said communication in a plurality of packets; each respective packet of said plurality of packets including at least two segments; a first segment of said at least two segments containing at least a portion of said communication in a plurality of information payload bits composed in a first encoding scheme; a second segment of said at least two segments containing overhead information relating to said respective packet in a plurality of overhead bits composed in a second encoding scheme; a predetermined number of said plurality of overhead bits being configured as priority-indicating bits to indicate said priority; and
   (b) at least one second network coupled with said at least one first network for receiving said communication; said at least one first network and said at least one second network cooperating to alter encoding of each respective said first segment of at least one selected packet-set of said plurality of packets to express said plurality of information payload bits in said selected packet-set in a third encoding scheme that is unreadable in said second network; said at least one second network employing said priority-indicating bits to ascertain said priority for handling said communication by said at least one second network; said second network preempting resources allocated to lower priority packet-sets as necessary to effect reserving resources for higher priority packet-sets;

at least one of said at least one first network and said at least one second network employing predetermined estimating rules regarding said priority-indicating bits to estimate likelihood of interruption of delivery of a low-priority said communication by said at least one second network.

2. A system for conveying priority associated with a communication conveyed among a plurality of networks; the system comprising:
   (a) at least one first network originating said communication in a plurality of packets; each respective packet of said plurality of packets including at least two segments; a first segment of said at least two segments containing at least a portion of said communication in a plurality of information payload bits composed in a first encoding scheme; a second segment of said at least two segments containing overhead information relating to said respective packet in a plurality of overhead bits composed in a second encoding scheme; a predetermined number of said plurality of overhead bits being configured as priority-indicating bits to indicate said priority; and
   (b) at least one second network coupled with said at least one first network for receiving said communication; said at least one first network and said at least one second network cooperating to alter encoding of each respective said first segment of at least one selected packet-set of said plurality of packets to express said plurality of information payload bits in said selected packet-set in a third encoding scheme that is unreadable in said second network; said at least one second network employing said priority-indicating bits to ascertain said priority for handling said communication by said at least one second network; said second network preempting resources allocated to lower priority packet-sets as necessary to effect reserving resources for higher priority packet-sets;

at least one of said at least one first network and said at least one second network employing predetermined processing rules regarding said priority-indicating bits to determine how to process said communication within said at least one second network using communication channels allocated for handling lower priority communications; at least one of said at least one first network and said at least one second network employing predetermined estimating rules regarding said priority-indicating bits to estimate likelihood of interruption of delivery of a low-priority said communication by said at least one second network.

3. The system of claim 2 wherein said first encoding scheme and said second encoding scheme are substantially the same encoding scheme; said same encoding scheme being an unencrypted expression of said information payload bits and said overhead bits.

4. The system of claim 3 wherein said third encoding scheme is an encrypted expression of said information payload bits.

5. A system for conveying priority associated with a message conveyed among a plurality of networks in a plurality of communication packets; each respective packet of said plurality of packets including at least two segments; a first segment of said at least two segments containing at least a portion of said message in a plurality of information payload bits; a second segment of said at least two segments containing overhead information relating to said respective packet in a plurality of overhead bits; the system comprising:
   (a) a first network of said plurality of networks having said first segment composed in a first unencrypted encoding scheme; said second segment in said first network being composed in a second unencrypted encoding scheme; a predetermined number of said plurality of overhead bits being configured as priority-indicating bits to indicate said priority; and (b) a second network of said plurality of networks coupled with said first network; said first network and said second network cooperating to alter encoding of each respective said first segment to express said plurality of information payload bits in a third encrypted encoding scheme that is unreadable in said second network; said second network employing said priority-indicating bits to ascertain said priority for handling said message within said second network; said second network preempting resources allocated to lower priority packet-sets as necessary to effect reserving resources for higher priority packet-sets;

at least one of said first network and said second network employing predetermined estimating rules regarding said priority-indicating bits to estimate likelihood of interruption of delivery of a low-priority said message by said second network.

6. A system for conveying priority associated with a message conveyed among a plurality of networks in a plurality of communication packets; each respective packet of said plurality of packets including at least two segments; a first segment of said at least two segments containing at least a portion of said message in a plurality of information payload bits; a second segment of said at least two segments containing overhead information relating to said respective packet in a plurality of overhead bits; the system comprising:

(a) a first network of said plurality of networks having said first segment composed in a first unencrypted encoding scheme; said second segment in said first network being composed in a second unencrypted encoding scheme; a predetermined number of said plurality of overhead bits being configured as priority-indicating bits to indicate said priority; and (b) a second network of said plurality of networks coupled with said first network; said first network and said second network cooperating to alter encoding of each respective said first segment to express said plurality of information payload bits in a third encrypted encoding scheme that is unreadable in said second network; said second network employing said priority-indicating bits to ascertain said priority for handling said message within said second network; said second network preempting resources allocated to lower priority packet-sets as necessary to effect reserving resources for higher priority packet-sets;

at least one of said first network and said second network employing predetermined processing rules regarding said priority-indicating bits to determine how to process said message within said second network using communication channels allocated for handling lower priority communications;

at least one of said first network and said second network employing predetermined estimating rules regarding said priority-indicating bits to estimate likelihood of interruption of delivery of a low-priority said message by said second network.

7. The system of claim 6 wherein said first unencrypted encoding scheme and said second unencrypted encoding scheme are substantially the same encoding scheme.

8. A method for conveying priority associated with a message conveyed among a plurality of networks in a plurality of communication packets; each respective packet of said plurality of packets including at least two segments; a first segment of said at least two segments containing at least a portion of said message in a plurality of information payload bits; a second segment of said at least two segments containing overhead information relating to said respective packet in a plurality of overhead bits; the method comprising:

(a) in no particular order:
(1) composing said first segment in a first unencrypted encoding scheme in a first network of said plurality of networks; and (2) composing said second segment in a second unencrypted encoding scheme in said first network;

(b) configuring a predetermined number of said plurality of overhead bits as priority-indicating bits to indicate said priority;

(c) operating a second network of said plurality of networks coupled with said first network cooperatively to alter encoding of each respective said first segment to express said plurality of information payload bits in a third encrypted encoding scheme that is unreadable in said second network; and (d) operating said second network to employ said priority-indicating bits for ascertaining said priority for handling said message by said second network; said second network preempting resources allocated to lower priority packet-sets as necessary to effect reserving resources for higher priority packet-sets;

said first unencrypted encoding scheme and said second unencrypted encoding scheme being substantially the same unencrypted encoding scheme.

9. A method for conveying priority associated with a message conveyed among a plurality of networks in a plurality of communication packets; each respective packet of said plurality of packets including at least two segments; a first segment of said at least two segments containing at least a portion of said message in a plurality of information payload bits; a second segment of said at least two segments containing overhead information relating to said respective packet in a plurality of overhead bits; the method comprising:

(a) in no particular order:
(1) composing said first segment in a first unencrypted encoding scheme in a first network of said plurality of networks; and
(2) composing said second segment in a second unencrypted encoding scheme in said first network;

(b) configuring a predetermined number of said plurality of overhead bits as priority-indicating bits to indicate said priority;

(c) operating a second network of said plurality of networks coupled with said first network cooperatively to alter encoding of each respective said first segment to express said plurality of information payload bits in a third encrypted encoding scheme that is unreadable in said second network; and (d) operating said second network to employ said priority-indicating bits for ascertaining said priority for handling said message by said second network; said second network preempting resources allocated to lower priority packet-sets as necessary to effect reserving resources for higher priority packet-sets;

at least one of said first network and said second network employing predetermined processing rules regarding said priority-indicating bits to determine how to process said message within said second network using communication channels allocated for handling lower priority communications;

at least one of said first network and said second network employing predetermined estimating rules regarding said priority-indicating bits to estimate likelihood of interruption of delivery of a low-priority said message by said second network.

10. The method of claim 9 wherein said first unencrypted encoding scheme and said second unencrypted encoding scheme are substantially the same encoding scheme.

* * * * *